United States Patent
Wang et al.

(10) Patent No.: US 8,520,074 B2
(45) Date of Patent: Aug. 27, 2013

(54) DETERMINING A TOTAL NUMBER OF PEOPLE IN AN IR IMAGE OBTAINED VIA AN IR IMAGING SYSTEM

(75) Inventors: Yao Rong Wang, Webster, NY (US); Zhigang Fan, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 441 days.

(21) Appl. No.: 12/967,775

(22) Filed: Dec. 14, 2010

(65) Prior Publication Data

US 2012/0147194 A1  Jun. 14, 2012

(51) Int. Cl.
  *H04N 5/33* (2006.01)
  *G06K 9/46* (2006.01)

(52) U.S. Cl.
  USPC .......................................... 348/164; 382/192

(58) Field of Classification Search
  USPC .......................................... 348/164; 382/192
  See application file for complete search history.

(56) References Cited

U.S. PATENT DOCUMENTS

| | | | |
|---|---|---|---|
| 5,539,517 A | 7/1996 | Cabib et al. | |
| 6,295,130 B1 | 9/2001 | Sun et al. | |
| 6,370,260 B1 | 4/2002 | Pavlidis et al. | |
| 6,373,568 B1 | 4/2002 | Miller et al. | |
| 6,721,692 B2 | 4/2004 | Mestha et al. | |
| 6,825,930 B2 | 11/2004 | Cronin et al. | |
| 6,829,370 B1 | 12/2004 | Pavlidis et al. | |
| 6,980,101 B2 | 12/2005 | Kelley | |
| 7,091,880 B2 | 8/2006 | Sorensen | |
| 7,304,801 B2 | 12/2007 | Wang et al. | |
| 7,355,714 B2 | 4/2008 | Wang et al. | |
| 7,385,704 B2 | 6/2008 | Mestha et al. | |
| 7,417,746 B2 | 8/2008 | Lin et al. | |
| 7,469,060 B2 | 12/2008 | Bazakos et al. | |
| 7,734,061 B2 | 6/2010 | Breed et al. | |
| 7,738,678 B2 | 6/2010 | Breed et al. | |
| 7,831,358 B2 | 11/2010 | Breed et al. | |
| 2003/0053659 A1 | 3/2003 | Pavlidis et al. | |
| 2003/0053664 A1 | 3/2003 | Pavlidis et al. | |
| 2006/0104488 A1* | 5/2006 | Bazakos et al. | 382/118 |
| 2006/0253249 A1 | 11/2006 | Bruelle-Drews | |

(Continued)

FOREIGN PATENT DOCUMENTS

WO  WO 2005/119571  6/2005

OTHER PUBLICATIONS

Varchei, et al., "People tracking using a network-based PTZ camera", Machine Vision and Applications DOI 10.1007/s00138-010-0300-1, Springer-Verlag, Published online: Oct. 1, 2010.

(Continued)

*Primary Examiner* — David Czekaj
*Assistant Examiner* — Tsion B Owens
(74) *Attorney, Agent, or Firm* — Philip E. Blair; Fleit Gibbons Gutman Bongini & Bianco P.L.

(57) ABSTRACT

What is disclosed is a novel system and method for determining the number of persons in an IR image obtained using an IR imaging system. The present method separates a human from the surrounding background via a set of particularly formed intensity ratios. Quantities derived from these ratios and threshold values are used to selectively classify whether a pixel in the IR image is from a human or from a non-human. Based upon the classification of the various pixels in the IR image, the number of persons is determined. Various embodiments are disclosed.

24 Claims, 13 Drawing Sheets

(56) References Cited

U.S. PATENT DOCUMENTS

2008/0175438 A1    7/2008   Alves
2009/0309974 A1   12/2009   Agrawal et al.
2010/0003044 A1    1/2010   Burry et al.
2010/0085213 A1    4/2010   Turnock et al.

OTHER PUBLICATIONS

Li, et al., "Probabilistically Semantic Labeling of IR Image for UAV", MVA2007 IAPR Conference on Machine Vision Applications, May 16-18, 2007, Tokyo, Japan, pp. 441-444.

Vehicle Occupancy Ltd.—News, Press Release, Jun. 11, 2007, http://www.vehicleoccupancy.com/pages/pr-140607.html.

Pavlidis, I., et al., "A Vehicle Occupant Counting System Based on Near-Infrared Phenomenology and Fuzzy Neural Classification", IEEE Transactions on intelligent transportation systems, vol. 1, No. 2, Jun. 2000.

Beletic, J.W., et al., "Teledyne Imaging Sensors: Infrared imaging technologies for Astronomy & Civil Space", Proceedings of the SPIE Conference on Astronomical Instrumentation, 2008, pp. 1-14, Marseille, France.

Pavlidis et al., "Automatic Passenger Counting in the High Occupancy Vehicle (HOV) Lanes", Proceedings 1999 Annual Meeting of the Intelligent Transportation Society of America, Washington, D.C., Apr. 19-22, 1999.

Pavlidis, I. et al., "A Near-Infrared Fusion Scheme for Automatic Detection of Vehicle Passengers", Proceedings 1999 IEEE Workshop on Computer Vision Beyond the Visible Spectrum: Methods and Applications, pp. 41-48, Fort Collins, CO, Jun. 22, 1999.

Penev et al., "Local feature analysis: a general statistical theory for object representation", network: Computation in Neural Systems, 7(3): 477-500, Aug. 1996, IOP Publishing Ltd.

Pavlidis, I., et al., "Automatic detection of vehicle occupants: the imaging problem and its solution", N.P., Machine Vision and Applications (11), No. 6, 2000, pp. 313-320.

Pérez,-Jiménez, A.J., et al., "High Occupancy Vehicle Detection", SSPR&SPR 2008, LNCS 5342, pp. 782-789.

Goktuk, S.B., et al., "An Occupant Classification System—Eigen Shapes or Knowledge-Based Features", MVIV05 (III: 57-57).

Nunez, A.S., et al., "Melanosome Level Estimation in Human Skin From Hyperspectral Imagery", Air Force Institute of Technology, OH 45433-7765, downloaded from IEEE Xplore on Aug. 2, 2010.

"Liquid Crystal Filled Fabri-Perot Filter", 2005 Meadowlark Optics, Inc., pp. 1-4.

Product Brochure—AISA Family of Hyperspectral Systems.

* cited by examiner

| | CLEAN GLASS | | | |
|---|---|---|---|---|
| | I(1-2)/I(3-2) | I(1-2)/I(4-2) | I(3-2)/I(4-2) | R12 |
| LIGHT SKIN | 0.544 | -0.318 | -0.581 | 0.862 |
| DARK SKIN | -0.228 | 0.299 | -1.311 | 0.527 |
| COTTON | 0.005 | 0.002 | 0.38 | 0.003 |
| WOOL | 0.0197 | 0.009 | 0.43 | 0.0107 |
| POLYAMIDE | -0.127 | -0.06 | 0.47 | 0.067 |

| | DIRTY GLASS | | | |
|---|---|---|---|---|
| | I(1-2)/I(3-2) | I(1-2)/I(4-2) | I(3-2)/I(4-2) | R12 |
| LIGHT SKIN | -7.386 | -0.182 | 0.025 | 7.204 |
| DARK SKIN | -1.04 | 0.241 | -0.231 | 1.281 |
| COTTON | -0.098 | -0.023 | 0.229 | 0.075 |
| WOOL | -0.071 | -0.019 | 0.273 | 0.052 |
| POLYAMIDE | -0.622 | -0.154 | 0.247 | 0.468 |

| | TINTED GLASS | | | |
|---|---|---|---|---|
| | I(1-2)/I(3-2) | I(1-2)/I(4-2) | I(3-2)/I(4-2) | R12 |
| LIGHT SKIN | 1.375 | -0.355 | -0.258 | 1.73 |
| DARK SKIN | -0.57 | 0.792 | -1.391 | 1.362 |
| COTTON | -0.077 | -0.014 | 0.182 | 0.063 |
| WOOL | -0.058 | -0.012 | 0.199 | 0.046 |
| POLYAMIDE | -0.363 | -0.067 | 0.184 | 0.296 |

FIG. 13

| | CLEAN GLASS | | | |
|---|---|---|---|---|
| | I(1-2)/I(3-2) | I(1-2)/I(4-2) | I(3-2)/I(4-2) | R12 |
| LIGHT SKIN | 0.429 | -0.32 | -0.744 | 0.749 |
| DARK SKIN | -0.26 | 0.499 | -1.919 | 0.759 |
| COTTON | -0.026 | -0.009 | 0.334 | 0.014 |
| WOOL | -0.0126 | -0.005 | 0.432 | 0.0076 |
| POLYAMIDE | -0.172 | -0.081 | 0.472 | 0.091 |

| | DIRTY GLASS | | | |
|---|---|---|---|---|
| | I(1-2)/I(3-2) | I(1-2)/I(4-2) | I(3-2)/I(4-2) | R12 |
| LIGHT SKIN | 0.143 | 5.965 | 41.69 | 5.822 |
| DARK SKIN | -0.409 | -0.646 | 1.579 | 0.237 |
| COTTON | -0.171 | -0.057 | 0.333 | 0.114 |
| WOOL | -0.164 | -0.061 | 0.369 | 0.103 |
| POLYAMIDE | -0.314 | -0.127 | 0.406 | 0.187 |

| | TINTED GLASS | | | |
|---|---|---|---|---|
| | I(1-2)/I(3-2) | I(1-2)/I(4-2) | I(3-2)/I(4-2) | R12 |
| LIGHT SKIN | 0.39 | -0.532 | -1.365 | 0.922 |
| DARK SKIN | -0.445 | -2.765 | 6.221 | 2.32 |
| COTTON | -0.124 | -0.028 | 0.222 | 0.096 |
| WOOL | -0.115 | -0.028 | 0.247 | 0.087 |
| POLYAMIDE | -0.322 | -0.089 | 0.275 | 0.233 |

FIG. 14

DETERMINING A TOTAL NUMBER OF PEOPLE IN AN IR IMAGE OBTAINED VIA AN IR IMAGING SYSTEM

TECHNICAL FIELD

The present invention is directed to systems and methods which use an infrared camera system to obtain a multiband IR image and then determine the total number of people in that IR image. The multiband image can be captured by either a sequentially illuminating multiband infrared source with a broad filter at the camera or a broad one band illuminating source with multi band pass filters at the camera.

BACKGROUND

There are many commercial face recognition systems (FRS) available in commerce. However, many of these systems require face positioning in front of a camera and good illumination. Such conditions are often not available where face recognition may be needed or desired. In many practical situations, the subject being sought for detection and recognition may be moving while passing in front of an infrared camera such as, for instance, while traveling in a car. Further, the illumination of the subject may be inadequate. This art needs methods for determining a number of humans in an image captured using an infrared camera.

What are needed in this art are systems and methods for determining the number of persons in an IR image obtained using an IR imaging system.

BRIEF SUMMARY

What is disclosed is a novel system and method for determining the number of persons in an IR image obtained using an IR imaging system. The present method separates a human from the surrounding background via a set of particularly formed intensity ratios. Quantities derived from these ratios and threshold values are used to selectively classify whether a pixel in the IR image is from a human or from a non-human. Based upon the classification of the various pixels in the IR image, the number of persons is determined.

In one example embodiment, the present system and method involves the following. First, a total of N intensity values are collected for each pixel in an IR image to be processed for human determination. The pixel intensity values are collected using an IR imaging system. Once the intensity values have been collected, each pixel in the IR image is processed to determine a classification for that pixel. Processing pixel intensities involves generating a ratio of the pixel's intensity values and forming a threshold therefrom. The threshold is used, in a manner more fully described herein, to classify the pixel as human or non-human. Once all the pixels have been classified, the total number of person in the IR image is determined based upon the pixel classifications. Such a system finds its intended uses in a wide array of real world applications such as, for instance, determining the total number of human occupants in a motor vehicle traveling in a HOV/HOT lane, or determining the number of humans in an image captured by a security camera in a hallway, for example.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 13 shows various results in the case wherein $\eta=0$;

FIG. 14 shows various results in the case wherein $\eta=0.05$;

DETAILED DESCRIPTION

What is disclosed is a novel system and method for determining the number of persons in an IR image obtained using an IR imaging system. The present method separates a human from the surrounding background via a set of particularly formed intensity ratios. Quantities derived from these ratios and threshold values are used to selectively classify whether a pixel in the IR image is from a human or from a non-human. Based upon the classification of the various pixels in the IR image, the number of persons is determined.

NON-LIMITING DEFINITIONS

Figure 1:
FIG. 1 shows an example IR image.

A "pixel" is the smallest addressable element in an image. Each pixel has its own address. Pixels are normally arranged in a grid. The intensity of each pixel is variable and depends on the characteristics and sensitivity of the sensing device being used to measure that pixel. The resolution for a camera is effectively the size of the pixel. Smaller pixels mean more of them will go into the image, giving it better definition An "IR Image" is an image obtained from an IR detection device having detected IR light reflected from an illuminated sample. A fully-populated IR image consists of pixels with each having an intensity value at each desired spectral band of interest. FIG. 1 shows an example IR image captured using an IR camera. Infrared (IR) light is electromagnetic radiation with a wavelength between 0.7 and 300 micrometers. It is to be noted that the upper end wavelength for IR range is not precisely set. This equates to a frequency range between 1 and 430 THz. IR wavelengths are longer than the wavelength of visible light, but shorter than the microwave. Bright sunlight provides an irradiance of approximately 1 kilowatt per square meter at sea level. Of this energy, 527 watts is infrared, 445 watts is visible light, and 32 watts is ultraviolet. In active infrared, the camera illuminates the scene at infrared wavelengths invisible to the human eye. Infrared energy is just one part of the electromagnetic spectrum that encompasses radiation from gamma rays, x-rays, ultra violet, a thin region of visible light, infrared, terahertz waves, microwaves, and radio waves. These are all related and differentiated in the length of their wavelength. Various embodiments hereof utilize the entire lower reflective infrared (LRIR) band (i.e., ≈800-1400 nanometers). LRIR may be detected with a multi-band imaging (MBI) device sensitive to that frequency band and provide images that resemble a black and white picture. The upper reflective infrared (URIR) band (i.e., ≈1400-2200 nanometers). A URIR sensed image is not like LRIR sensed images in that human flesh does not reflect IR in the same manner as inanimate objects. Since the lower and upper IR bands are reflective, the scene may need a source of illumination. Such illumination need not be visible and so will not be a distraction to human beings. In the daytime, the LRIR and URIR illumination may be unnecessary because sufficient IR illumination may be provided by ordinary sunlight.

An "IR illuminator" is a light source. Light levels may be controlled by varying the drive currents. For example, the optical output of LEDs varies linearly with current. LED arrays capable of IR illumination both in time-sequential fashion or simultaneously, are well known. One example IR illumination system is shown in FIG. 2.

Figure 3:
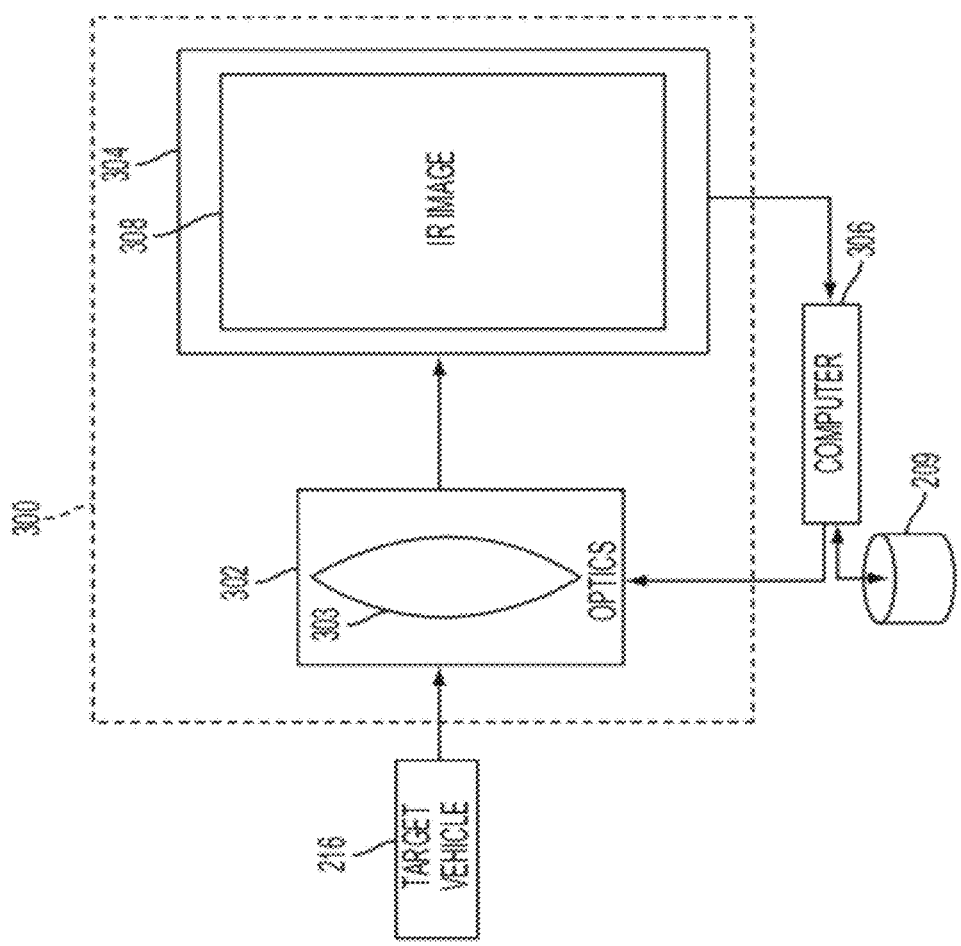
FIG. 3 illustrates one embodiment of an example IR detection system 300 for use in accordance with the teachings hereof.

An "IR Imaging System" is an apparatus designed to capture IR light reflected from a target object, separate it into its component wavelengths, and output an IR image of the target. Such systems have an IR detector (such as an IR camera) and an IR Illuminator. One example IR detection system is shown in FIG. 3. An IR imaging system can be either a single IR detection device and a sequentially illuminated N-band illuminator (N≧3) with one fixed filter, or comprise a total of N detection devices (N≧3) each having a respective band pass filter, and a single illumination source.

Example Illumination System

Figure 2:
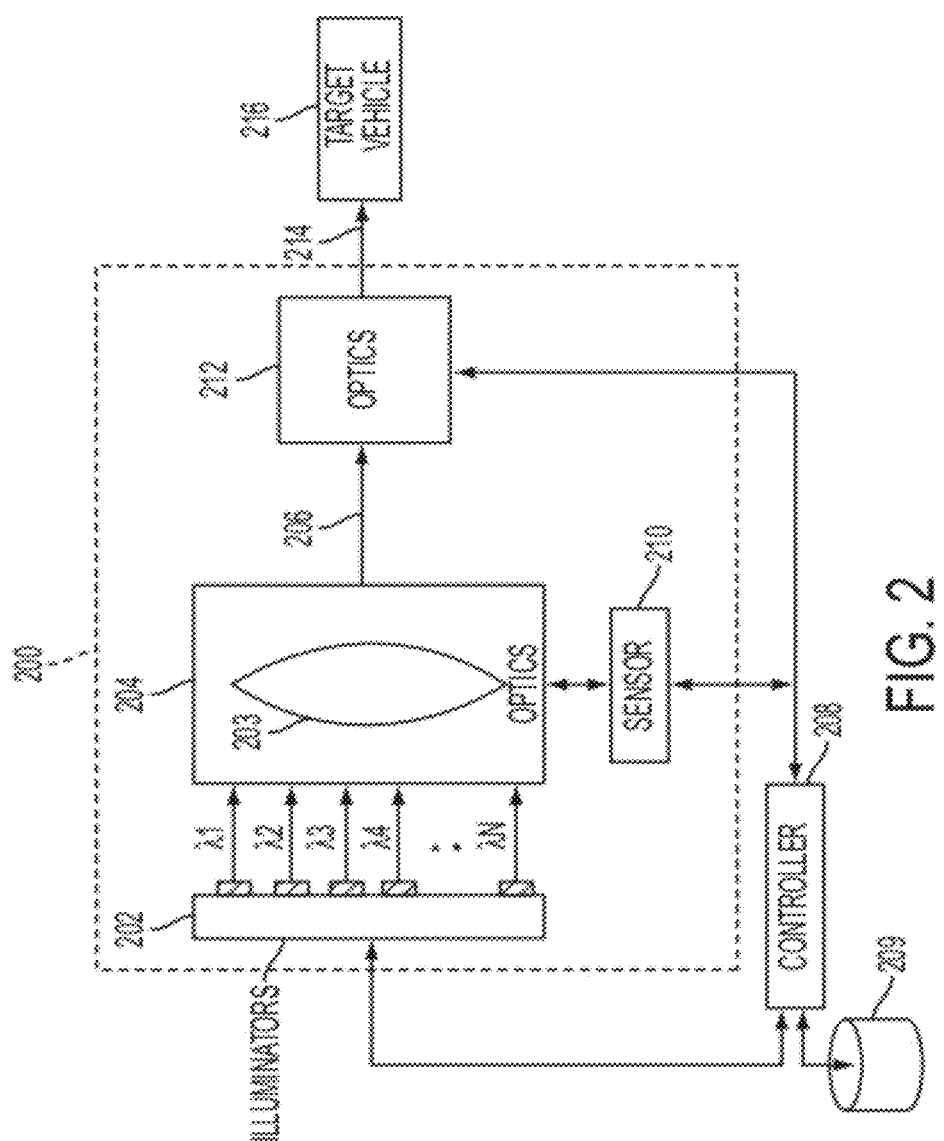
FIG. 2 illustrates one embodiment of an example IR illumination system for illuminating a target vehicle in accordance with the teachings hereof.

Reference is now being made to FIG. 2 which illustrates one embodiment of an example IR illumination system for use in accordance with the teachings hereof.

The IR illumination system 200 of FIG. 2 is shown comprising an IR light source array 202 having a plurality of IR light sources each emitting a narrow band of IR radiation at a respective peak wavelength (shown as $\lambda_1, \ldots, \lambda_n$). Source array 202 comprises an array of light emitting diodes (LEDs). Each diode is selected to emit IR radiation at a particular wavelength band and defines a source in the array for that wavelength band. Controller 208 is coupled to IR source array 202 and controls the input current to each illuminator and thereby, the intensity output of each. Sensing optics 204 has one or more optics 203 which combine the wavelengths to produce IR illumination beam 206. Sensor 210 samples the radiation emitted from the IR light source array and provides feedback to controller 208. Focusing Optics 212 receives beam 206 and focuses output beam 214 onto target vehicle 216. Optics 212 includes a plurality of lens of varying focal lengths positioned in the beam path to focus the beam. Controller 208 is also coupled to optics 212 to effectuate changes in output beam 214 due to target size, target distance, target speed, to name a few constraints. Controller 208 is further in communication with storage device 209 to store/retrieve calibration information, intensity levels, and the like, including data and machine readable program instructions. Controller 208 may comprise a computer system such as a desktop, server, mainframe, and the like. Controller 208 may be placed in wired or wireless communication with such a computing device over a network (not shown). Such a network may be a local area network (LAN) or the Internet. It should be appreciated that any of the components of illumination system 200 may be placed in communication with such a computing system to further facilitate the intended purposes hereof.

Any of the optics described above with respect to FIG. 2, can be replaced with an optical system having optical power and may further include mirrors. Such an optical system may include multiple components each having optical power, e.g., it may be doublet or a triple lens. In the limit that such optical system defines a unique focal length F, the source array and grating would be positioned in the front and back focal planes of the optics. As a result, the optical system images the grating at infinity with respect to each element of the light source array, and thus each source element sees the same region of the grating. The light from each element would be coextensive on that region. The grating can then produce output radiation whose spectral content is substantially uniform across its transverse profile by compensating for the dispersion associated with lateral position of the different wavelength band sources. This allows the spectral content of output beam 214 to be substantially uniform across its transverse profile. In practice, it may be difficult to precisely define a desired focal length for the optical system because of aberrations (e.g., field curvature, axial chromatic, lateral chromatic, distortion, coma, and the like, which may cause the optics to focus rays to slightly different positions according to their wavelength or their lateral positioning.

In addition, the relative positions of the optical system, the source array, and the grating are selected according to the more general condition that the optical system images the grating at infinity with respect to each source element of the light source array, at least for paraxial rays that emerge from each source. For a ray propagating at an angle θ to the optical axis, a paraxial ray has $\sin(\theta) \approx \theta$. This infinity condition can be achieved by positioning each source element at a nominal back focal plane of the optical system to within the depth of field of the optical system, and positioning the grating at nominal front focal plane of the optical system to within the depth of field of the optical system. The depth of field (DOV) is related to the numerical aperture (NA) of the optical system according to $DOV = lambda/NA^2$, where Lambda is the wavelength of the light from the source element. Moreover, the optics may be designed with components to provide multiple degrees of freedom to compensate for various optical aberrations. Although additional components in the optical system provide additional degrees of freedom for reducing aberrations, each additional component also adds cost and complexity to the optical system.

Example IR Detection System

Reference is now being made to FIG. 3 which illustrates one embodiment of an example IR detection system 300 for use in accordance with the teachings hereof.

Target vehicle 216 reflects the IR light of beam 214 being emitted by optics 212 of FIG. 2. A portion of the reflected IR light is received by optics 302 having one or more lens 303 that focus the received light onto sensor 304 which spatially resolves the received light to obtain IR image 308. The optics 302 may also include one or more band pass filters that only allow light in a narrow band of wavelength to pass though. The filters may also be sequentially changed to get N intensities at 308. Sensor 304 sends the IR image information to computer 306 for processing and storage. Image detector 308 is a multispectral image detection device whose spectral content may be selectable through a controller (not shown). Suitable optics for source optics 302 and detector 304 include those commonly found in the arts. Detector 304 independently records light intensity at multiple pixels locations along a two dimensional grid. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixelated photomultiplier tube (PMT) detectors, Indium Gallium Arsenide (InGaAs), Mercury Cadmium Telluride (MCT), and Microbolometer. It is to be noted that the silicon based detectors are limited to below 1100 nm. Systems with hybrid detectors (i.e., combinations of silicon based and non-silicon based) are not out-of-reach. Computer 306 is in communication with optics 302 to control the lens thereof, and with detector 304 to control the sensitivity thereof. Computer 306 receives the sensitivity values associated with each pixel of IR image 308. Computer 306 further includes a keyboard, monitor, printer, etc. (not shown) as is necessary to effectuate the control of system 300.

Example IR Imaging System

Figure 4:
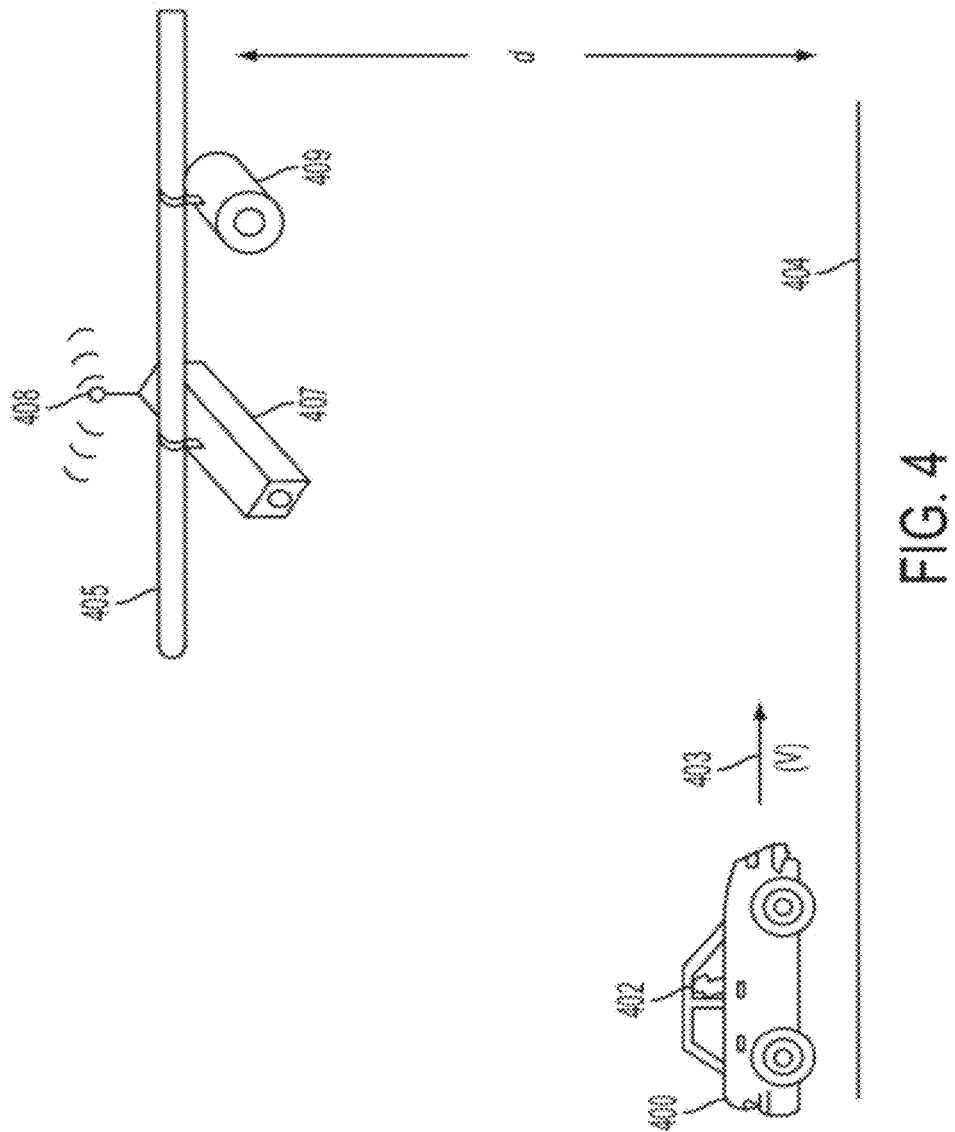
FIG. 4 shows an example vehicle occupancy detection system incorporating the illumination system of FIG. 2 and the detection system of FIG. 3.

Reference is now being made to FIG. 4 which shows an example vehicle occupancy detection system which incorporates the illumination system of FIG. 2 and the detection system of FIG. 3.

In FIG. 4, target vehicle 400 contains a human occupant 402 traveling at velocity v in a direction of motion indicated by directional vector 403 along HOV lane 404. Positioned within a desired distance d above lane 404 is support arm 405 comprising a tubular construction similar to that used for traffic lights. Fixed onto arm 405 are IR detection system 407 having a transmission element 408 for communication with a remote device, and IR illumination system 409. System 409 and 407 are intended to represent embodiments of the systems of FIGS. 2 and 3, respectively. Detection device 407 may comprise a camera equipped with a telephoto lens, a band-pass filter, and a polarizing lens to reduce a glare effect. During daytime operation, illumination by the sun may be sufficient. IR illuminator 409 emits IR radiation at one or more wavelengths which are reflected back to detector 207 from the target vehicle and the contents therein. IR detection system 407 transmits the IR image and/or intensity values associated with each pixel in the IR image to a computing device for further processing in a manner which will be next described.

Example Flow Diagram

Figure 5:
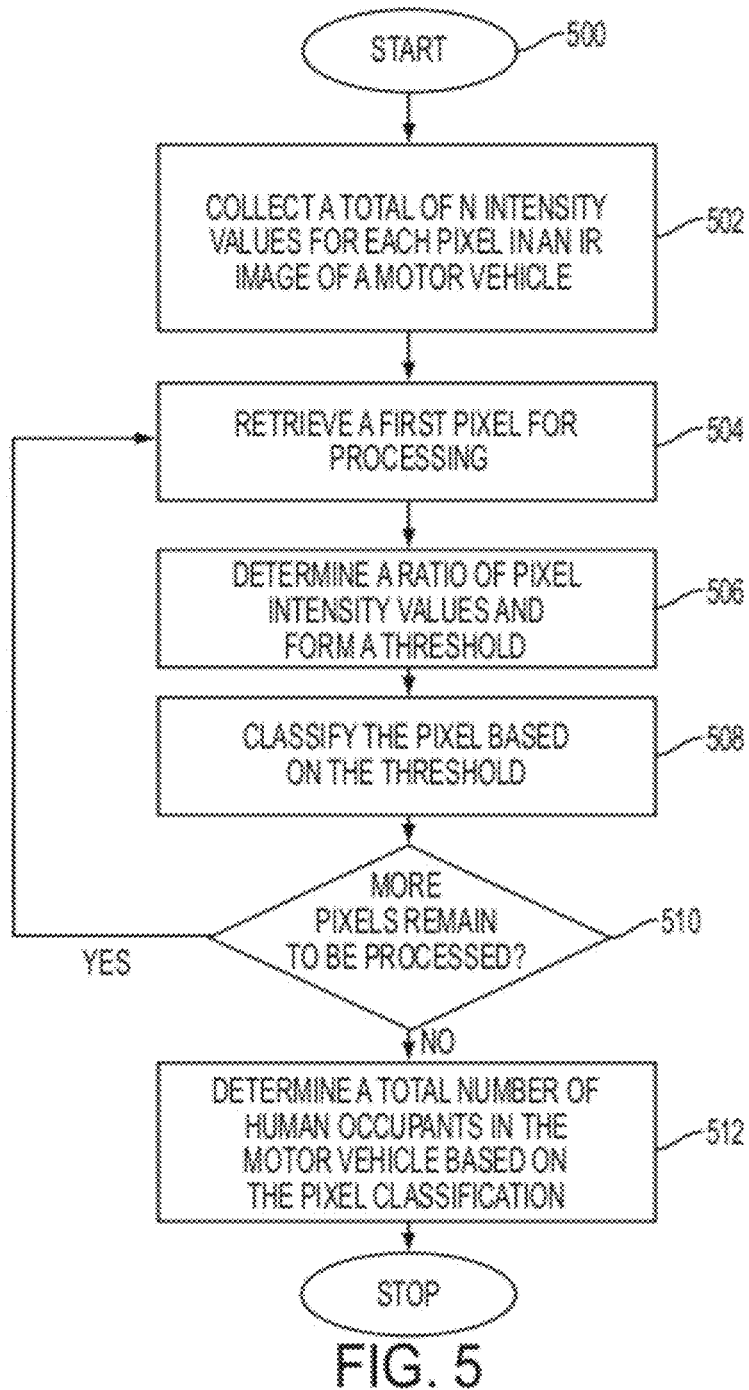
FIG. 5 illustrates one example embodiment of the present method for determining the number of occupants in a vehicle in a transportation management system.
Figure 6:
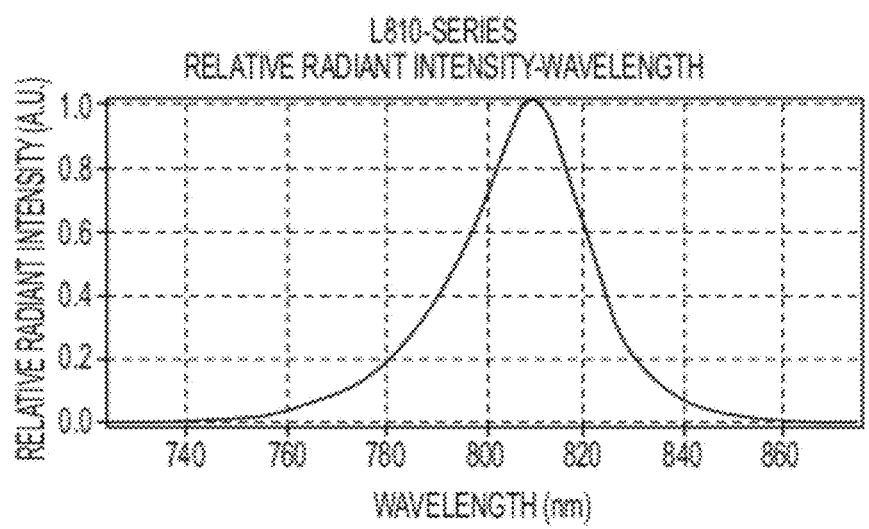
FIGS. 6-12 show relative radiant intensity of IR LEDs suitable for use with various embodiments hereof.
Figure 7:
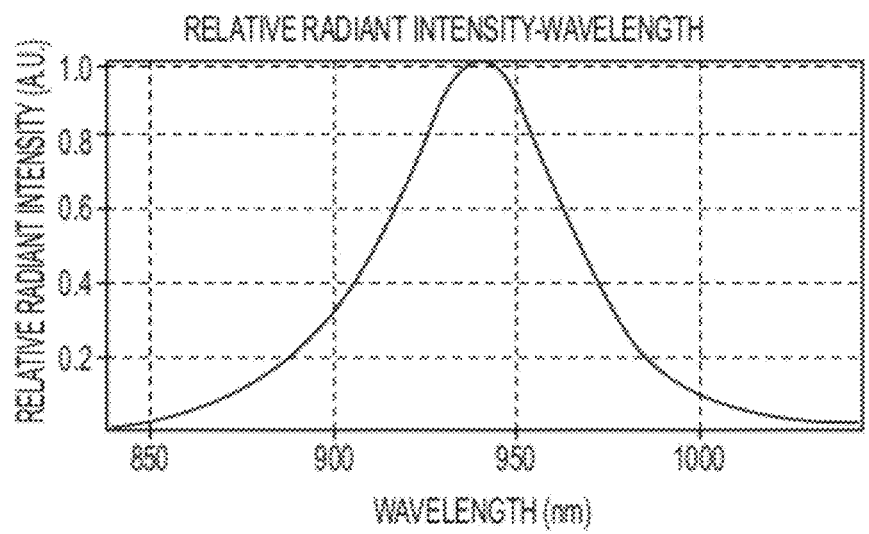
Figure 8:
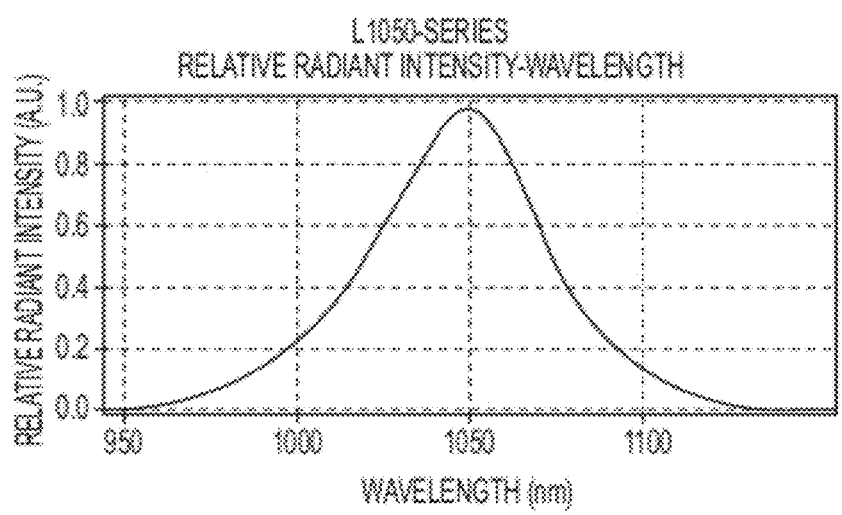
Figure 9:
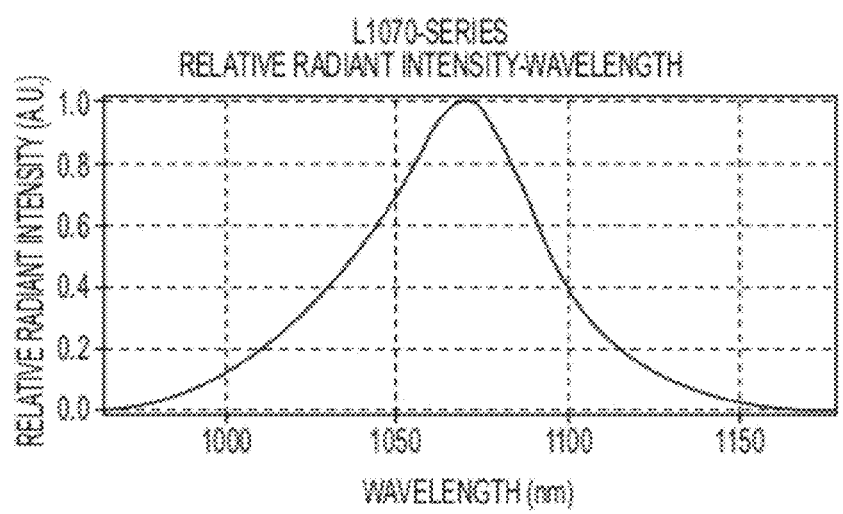
Figure 10:
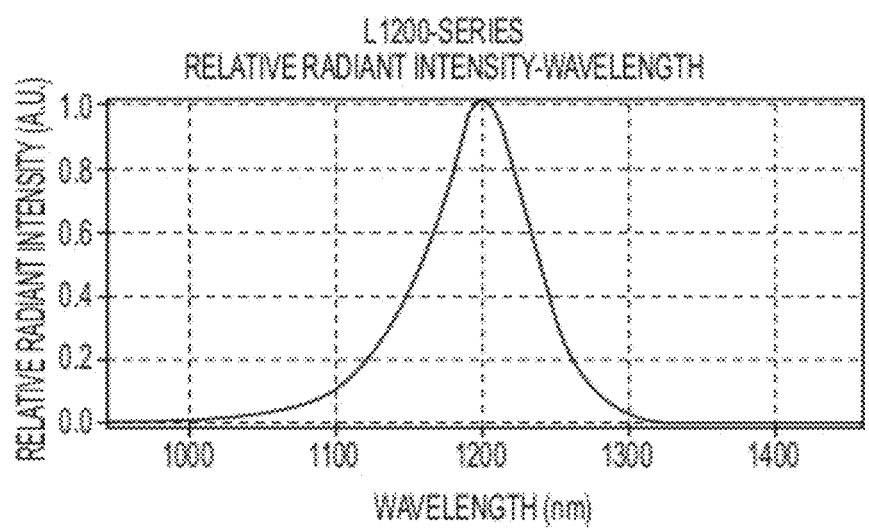
Figure 11:
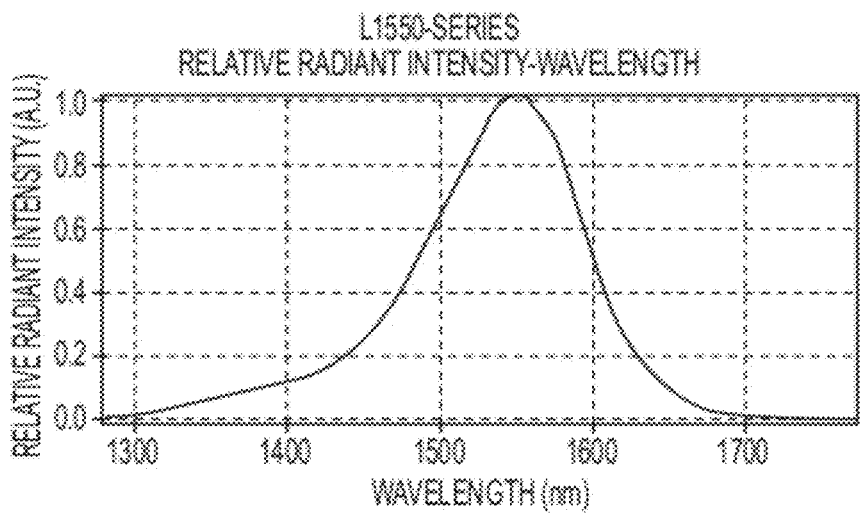
Figure 12:
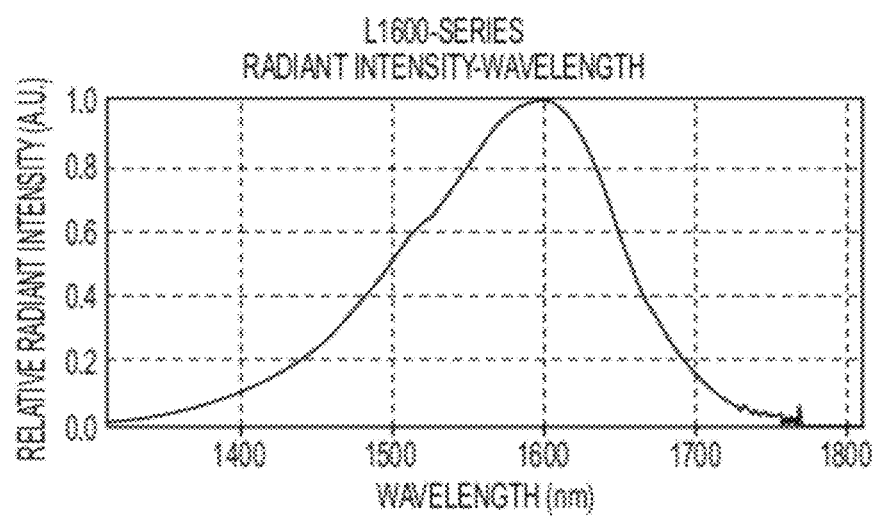

Reference is now being made to the flow diagram of FIG. 5 which illustrates one example embodiment of the present method for determining the number of occupants in a vehicle in a transportation management system. Flow processing starts at 500 and immediately proceeds to step 502. It should be appreciated that, although one example embodiment is discussed herein in the context of a transportation management system, the teachings hereof are intended to find their uses in a wide array of systems wherein determining a number of persons in an IR image obtained using an IR imaging system is desired. Such embodiments are intended to fall within the scope of the appended claims.

At step 502, a total of N intensity values are collected for each pixel in an IR image of a motor vehicle intended to be processed for human occupancy determination. The vehicle to be processed is traveling at a given velocity along a HOV lane being illuminated by IR illumination. The intensity values for each pixel are collected from the reflected IR light source using the IR imaging system of FIGS. 2-4. The IR image and/or the intensity values for each pixel are provided to a computer workstation or special purpose computer system for further processing in accordance with the various embodiments hereof. In the following, it is assumed that the IR attenuation in the air and the integration time to be the same for all bands. If not, these factors should be adjusted accordingly.

If the IR detection device is a single IR detection device, and the IR Illuminator is a sequentially illuminating N-band illuminator (N 3) with one fixed filter, the intensity value comprises:

$$I_c(i) = \alpha \int_{\lambda_1}^{\lambda_2} I_s^i(\lambda)[T_G^2(\lambda)R_o(\lambda) + \eta R_G(\lambda)]T_L(\lambda)D(\lambda)d\lambda + I_b, \quad (1)$$

where i=1 ... N, such that i is the $i^{th}$ IR band from the illuminator that is sequentially illuminating, $\alpha$ is a constant that depends on an angle and distance from the illumination source, an attenuation of an IR wave in the air, and an integration time of the detecting device, $I_s^i(\lambda)$ is the intensity of the $i^{th}$ band of the light source, $I_b$ is an intensity from a background light source such as that from the IR component of sunlight, $R_o(\lambda)$ is a reflectance of an object inside the vehicle, $R_G(\lambda)$ and $T_G(\lambda)$ are a reflectance and a transmittance of glass, constant $\eta$ is a measure of the percentage of light from the illuminator reflected from vehicle glass and received by the detector, $T_L(\lambda)$ is a transmittance of the fixed filter, and $D(\lambda)$ is a responsivity of the detection device.

If the IR detection device is N detection devices having N band pass filters (N≧3), and the IR Illuminator has one illuminator covering a wavelength range of the filters, the intensity value comprises:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b, \quad (2)$$

where i=1 ... N, such that i is the $i^{th}$ IR band pass filter, $\alpha$ is a constant that depends on an angle and distance from the illumination source, an attenuation of an IR wave in the air, and an integration time of the detecting device, $I_s(\lambda)$ is the intensity of the light source, $I_b$ is a background intensity, $R_o(\lambda)$ is a reflectance of an object inside the vehicle, $R_G(\lambda)$ and $T_G(\lambda)$ are a reflectance and a transmittance of glass, constant $\eta$ is a measure of the percentage of light from the illuminator reflected from vehicle glass and received by the detector, $T_L^i(\lambda)$ is a transmittance of the $i^{th}$ filter, and $D(\lambda)$ is a responsivity of the detecting device.

Moreover, any of the pixel intensity values can be combined to generate one or more new intensity values for this pixel and processed accordingly.

At step 504, a first pixel of the IR image is retrieved for processing. The first pixel may be selected automatically by a processor or be identified by a user using a graphical user interface such as, for instance, a keyboard, mouse, and monitor, associated with a computer workstation whereon various aspects of the present method are intended to be performed. The user may select a first region of the received IR image and some or all of the pixels within the selected area of the image processed ahead of other portions of the IR image. One or more IR images of the moving vehicle can be captured for processing in accordance herewith.

At step 506, determine a ratio of pixel intensity values and a form a threshold therefrom. At step 508, classify the pixel based on the threshold. In one embodiment, the ratio of intensity values is given by:

$$[I_c(i) - I_c(k)] / [I_c(j) - I_c(k)], \quad (3)$$

where i and j are any of the N-band indices of the IR imaging system, except the index associated with band k. When the illuminator is illuminating the object and the detection device has detected the image, each pixel will have N intensities for an N band illuminator. Using N intensities as an example, one can take one band as the reference (e.g., the first band), and form the following ratio:

$$\frac{I_c(i) - I_c(1)}{I_c(j) - I_c(1)} = \frac{A_i - A_1 + \eta(B_i - B_1)}{A_j - A_1 + \eta(B_j - B_1)} \quad (4)$$

where i, j=2, ..., N, and where:

$$A_i = \int_{\lambda_1}^{\lambda_2} I_s^i(\lambda) T_G^2(\lambda) R_o(\lambda) T_L(\lambda) D(\lambda) d\lambda \quad (5)$$

$$B_i = \int_{\lambda_1}^{\lambda_2} I_s^i(\lambda) R_G(\lambda) T_L(\lambda) D(\lambda) d\lambda \quad (6)$$

Here, the ratio in Eq. (4) depends on constant η. For most situations, η is small (or zero). For dirty, foggy or rainy window conditions, η can be significant. It should be appreciated that the use of Eq. (4) in a real product does not require a model because the left-hand side quantity only requires the measured intensity from the detecting camera. However, in a development and testing stage, one may use a model to calculate the quantities in the right side of Eq. (4) for selecting which set of ratios should be used, and how to set the threshold value for classification.

At step 510 a determination is made whether any more pixels remain to be processed. If so then processing repeats with respect to step 504 wherein a next pixel is retrieved, selected, or otherwise identified for processing. Processing repeats until all desired pixels in the IR image have been processed.

At step 512 a total number of human occupants in the target motor vehicle is then determined based upon the various pixel classifications. Once pixels in the image of a person can be separated from surrounding non-human objects, neural networks or fuzzy logic can be employed to facilitate a determination of the number of occupants in the vehicle. In one embodiment, this is achieved by spatially isolating identified humans in each of the one or more IR images taken by the imaging system of the target vehicle and counting the number of humans in the vehicle. If three IR cameras are employed such as, for instance, one facing the front of the moving vehicle to capture an image of the occupants in the front passenger compartment, and one facing each side of the vehicle to capture an image of the passenger and driver's side, each of the images can be analyzed to determine whether or not a human occupant is present. In operation, if the number of human occupants of the targeted motor vehicle exceeds a predetermined number during the time of day where travel in a HOV lane is restricted, the license plate of the vehicle is automatically captured using vehicle tag identification technology known in the arts, and a signal is sent to a traffic enforcement authority indicating that a vehicle with that identified license plate number is using the HOV lane without the required number of occupants.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Performance Results

We used a 4 band illuminator system for our study. The LEDs used are with peak wavelength at 940 nm, 1070 nm, 1200 nm, and 1550 nm. The power spectra for the LEDs are shown in FIGS. 6-12. Near infrared (NIR) LEDs are already available in the market. These LEDs are made with various semiconductors such as GaAs or InGaAsP, and have peak wavelength starting from close to the visible (>730 nm) up to short wavelength infrared (>2000 nm). FIGS. 6-12 illustrate the spectrum of several infrared LEDs made from InGaAsP with peak wavelengths ranging between 810 nm to 1600 nm. These LEDs have good radiant power, between a few mW to about 45 mW for the high power ones. One can bundle together many LEDs with the same peak wavelength into a batch or a group. This study assumes each LED illuminator is equally powered (if not then the ratios in the following tables can be adjusted). The reflectance of various materials, including those of human skin, and the transmittance of the window are available in a wide array of published literature. The IR detection camera is commercially available and captures images from 900 nm to 1700 nm.

We first considered the case for η=0. The results for various ratios in Eq. (4) are shown in the tables of FIG. 13. In FIG. 13, $I(1-2)=I_c(1)-I_c(2)$, etc. For a clean window, the ratio I(3-2)/I(4-2) is negative for human skin, and positive for cotton, wool and polyamide. Thus, if one sets the threshold value for this ratio at zero, pixels of human image can be properly classified. Since this ratio only involves the 1070 nm, 1200 nm and the 1550 nm bands, only 3 illumination LEDs are needed for skin separation. For a dirty window, this ratio becomes positive for light skin, although still close to zero. To remedy this, one can look another quantity R12 as defined by the ratio:

$$\left| \frac{I_c(1) - I_c(1)}{I_c(3) - I_c(2)} - \frac{I_c(1) - I_c(2)}{I_c(4) - I_c(2)} \right| \quad (8)$$

This quantity is relatively large for skin, but small for the other three materials.

To evaluate the effect of η, let us first examine the condition that any camera system requires, i.e., $$T_G^2(\lambda) R_o(\lambda) \gg \eta R_G(\lambda). \quad (9)$$

For a clean glass, $T_G(\lambda)$ is in the range between 0.5 to 0.8, while for a dirty glass, it can go as low as 0.2. The system is expected to not work well when η~0.05 for the dirty glass.

FIG. 14 shows results for various ratios in Eq. (4) for η=0.05. We see that simply using the ratio I(3-2)/I(4-2) and setting the threshold to zero will not work for the dirty glass and for tinted glass if a human has dark skin. The quantity R12 seems still quite robust if one set the threshold at 0.3, although this will misinterpret the dark skin inside the dirty window as fabric.

Example Block Diagram

Figure 15:
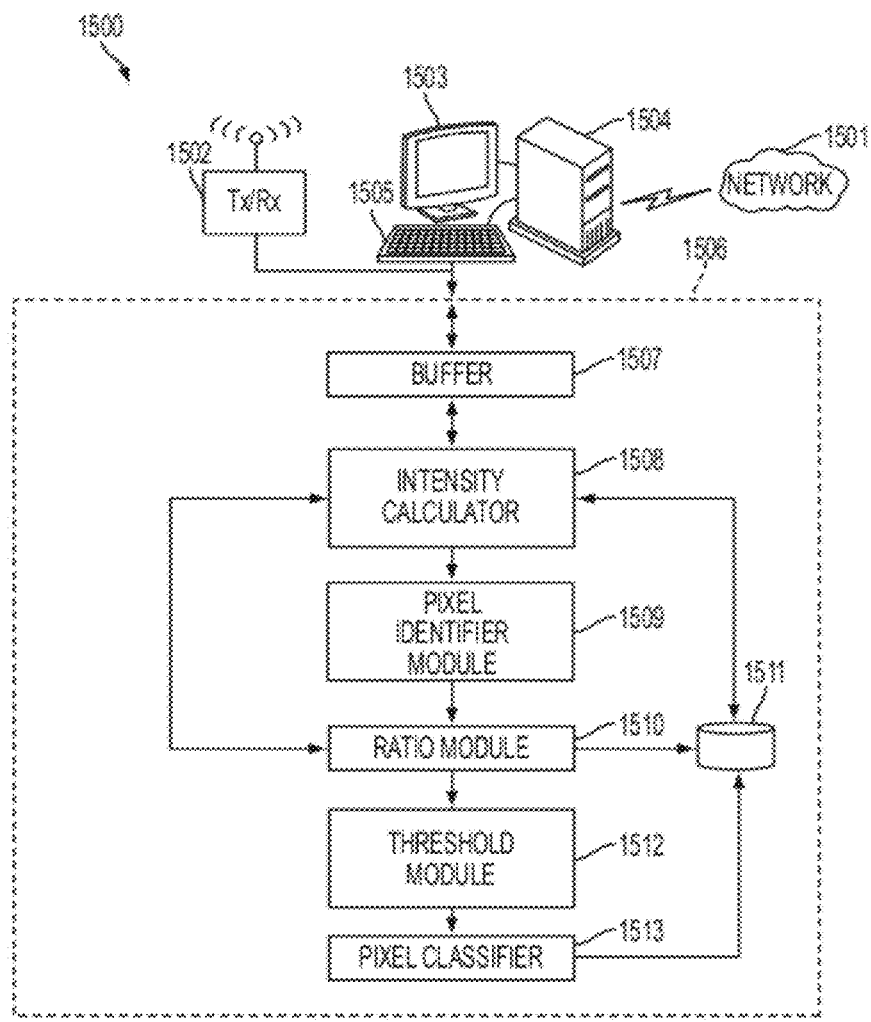
FIG. 15 illustrates a block diagram of one example system capable of implementing various aspects of the present method shown and described with respect to the flow diagram of FIG. 5.

Reference is now being made to FIG. 15 which illustrates a block diagram of one example processing system capable of implementing various aspects of the present method shown and described with respect to the flow diagram of FIG. 5.

The embodiment of FIG. 15 is shown comprising a workstation 1504 in communication with IR image receiver 1502 for receiving pixel intensity values from antenna 408 of IR detection device 407 of FIG. 4 and for effectuating bi-directional communication between computer 1504 and detection device 408. Computer 1504 has a monitor 1503 and user interface 1505 for enabling a display of information for a user and for effectuating a user input or selection. Computer 1504 is also in communication with network 1501 via a network communications interface (not shown). Various portions of the captured IR image and/or pixel intensity values may be stored to a memory or storage device internal to workstation 1504 and may be communicated to a remote device over network 1501 for storage or further processing. A user may use the graphical user interface, e.g., keyboard and monitor, to identify or otherwise select pixels and/or areas of the IR image for processing or provide other user input required for the implementation hereof. Pixels and/or regions of interest identified or otherwise detected in the received IR image data may be retrieved from a remote device, such as an image processing system over network 1501. Desktop computer 1504 and receiver 1502 are in communication with Image Processor 1506.

Image Processor 1506 is shown comprising a Buffer 1507 for queuing information relating to the received IR image such as, for instance, regions of interest within the image, and the like, which have been selected or otherwise identified for pixel processing. Buffer 1507 may further store retrieved data and mathematical formulas and representations to process the pages and groups of pages in the above-described manner. Intensity Calculator 1508 receives from workstation 1504 data and information about the variables needed to perform the calculations required with respect to any of Eqs. (1) and (2). Pixel Identifier Module 1509 identifies the current pixel which is to be processed, as described above with respect to step 504. Module 1509 is in communication with monitor 1503 to present thereon a display for the user to select which pixel in the displayed IR image is intended to be processed next. The user may select some or all of the displayed IR image for processing. In other embodiments, the image is processed automatically, and it should be understood that such embodiments are intended to fall within the scope of the appended claims. Ratio Module 1510 is a processor with memory in communication with Intensity Module 1508 to obtain the pixel intensity values for the current pixel. Ratio Module 1510 generates the ratios described above with respect to Eq. (3) and saves the results to storage device 1511. Module 1508 further stores/retrieves values to/from storage device 1511 for retrieval by module 1510. Threshold Module 1512 determines a threshold value and provides that value to Pixel Classification Processor 1513 which performs the classification of the identified pixel according to the above-described method steps. The classification of this pixel is saved to storage device 1511.

Figure 16:
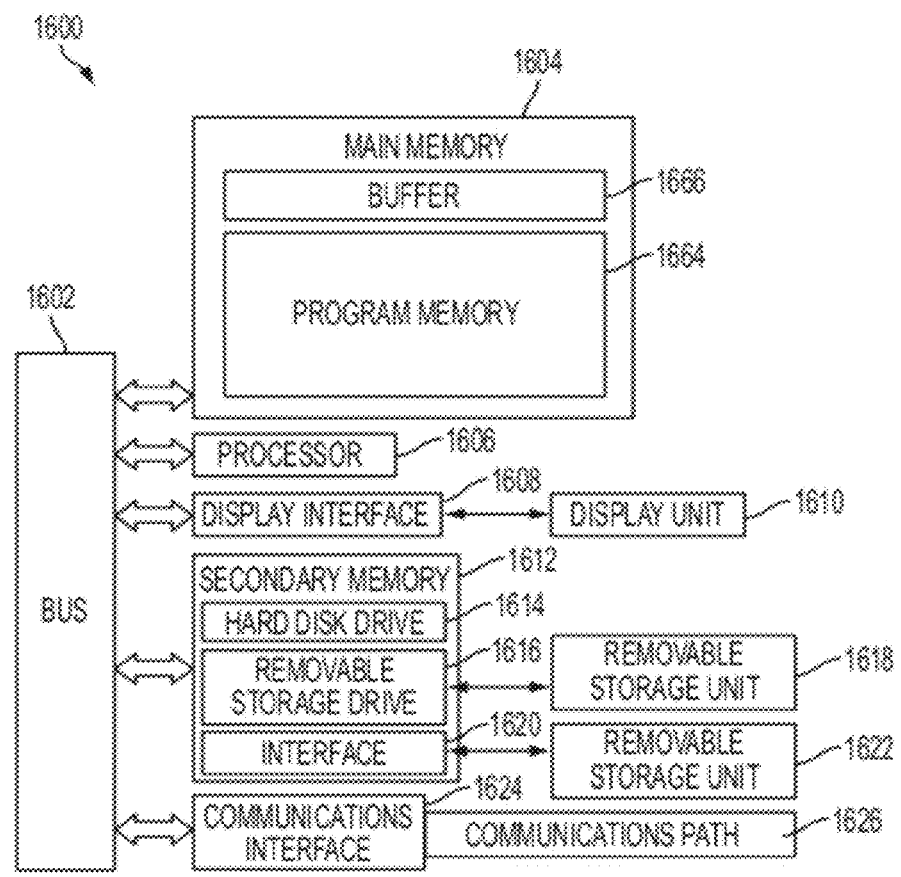
FIG. 16 illustrates a block diagram of one example embodiment of a special purpose computer system for performing one or more aspects of the present system and method as described with respect to the example flow diagram of FIG. 5 and the example functional block diagram of FIG. 15.

It should be understood that any of the modules and processing units of FIG. 15 are in communication with storage device 1511 via pathways shown or not shown and may store/retrieve data, parameter values, functions, pages, records, data, and machine readable/executable program instructions required to perform their intended functions. Each of these modules is also in communication with workstation 1504 via pathways (not shown) and may further be in communication with one or more remote devices over network 1501. It should be appreciated that some or all of the functionality for any of the modules may be performed, in whole or in part, by components internal to workstation 1504 or by a special purpose computer system as shown in FIG. 16. It should also be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Reference is now being made to FIG. 16 which illustrates a block diagram of one example special purpose computer for implementing one or more aspects of the present method as described with respect to the flow diagram of FIG. 5, and the various modules and processing units of the block diagram of FIG. 15. Such a special purpose processor is capable of executing machine executable program instructions and may comprise any of a micro-processor, micro-controller, ASIC, electronic circuit, or any combination thereof.

Special purpose computer system 1600 includes processor 1606 for executing machine executable program instructions for carrying out all or some of the present method. The processor is in communication with bus 1602. The system includes main memory 1604 for storing machine readable instructions. Main memory may comprise random access memory (RAM) to support reprogramming and flexible data storage. Buffer 1666 stores data addressable by the processor. Program memory 1664 stores machine readable instructions for performing the present method. A display interface 1608 forwards data from bus 1602 to display 1610. Secondary memory 1612 includes a hard disk 1614 and storage device 1616 capable of reading/writing to removable storage unit 1618, such as a floppy disk, magnetic tape, optical disk, etc. Secondary memory 1612 may further include other mechanisms for allowing programs and/or machine executable instructions to be loaded onto the processor. Such mechanisms may include, for example, a storage unit 1622 adapted to exchange data through interface 1620 which enables the transfer of software and data. The system includes a communications interface 1624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1626 which carries such signals and may be implemented using wire, cable, fiber optic, phone line, cellular link, RF, memory, or other means known in the arts. The teachings hereof can be implemented in hardware or software using any known or later developed systems, structures, devices, and/or software by those skilled in the applicable art without undue experimentation from the functional description provided herein with a general knowledge of the relevant arts.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for determining the number of living objects in an IR image obtained by an IR imaging system, the method comprising:
   collecting a total of N intensity values for each pixel in an IR image said intensity values having been collected using a IR imaging system comprising an IR detection device and an IR Illuminator;
   for each pixel in said IR image:
   generating a ratio of said pixel's collected intensity values comprising:

$$[I_c(i) - I_c(k)] / [I_c(j) - I_c(k)],$$

where i, j, k are any N-band indices different from each other;
   forming a threshold from said generated ratio; and
   using said threshold to classify said pixel as being from a living or non-living object; and
   determining a total number of living objects in said IR image based upon said pixel classifications.

2. The method of claim 1, wherein said IR detection device is a single IR detection device, and wherein said IR Illuminator is a sequentially illuminating N-band illuminator (N≧3) with one fixed filter, said intensity value comprising:

$$I_c(i) = \alpha \int_{\lambda_1}^{\lambda_2} I_s^i(\lambda)[T_G^2(\lambda)R_o(\lambda) + \eta R_G(\lambda)]T_L(\lambda)D(\lambda)d\lambda + I_b,$$

where i=1 . . . N, such that i is the $i^{th}$ IR band from said illuminator that is sequentially illuminating, α is a constant that depends on an angle and distance from said illumination source, an attenuation of an IR wave in the air, and an integration time of said detecting device, $I_s^i(\lambda)$ is the intensity of the $i^{th}$ based on the light source, $I_b$ is an intensity from a background light source such as that from the IR component of sunlight, $R_o(\lambda)$ is a reflectance of an object detected by said IR detection device, $R_G(\lambda)$ and $T_G(\lambda)$ are a reflectance and a transmittance of glass, otherwise $R_G(\lambda)=0$ and $T_G(\lambda)=1$, constant η is a measure of the percentage of light from said illuminator reflected from vehicle glass and received by said detector, otherwise η is zero, $T_L(\lambda)$ is a transmittance of said fixed filter, and $D(\lambda)$ is a responsivity of said detection device.

3. The method of claim 1, wherein said IR detection device is N detection devices having N band pass filters (N≧3), and said IR Illuminator has one illuminator covering a wavelength range of said filters, said intensity value comprising:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b,$$

where i=1 . . . N, such that i is the $i^{th}$ IR band pass filter, α is a constant that depends on an angle and distance from said illumination source, an attenuation of an IR wave in the air, and an integration time of said detecting device, $I_s(\lambda)$ is the intensity of the light source, $I_b$ is a background intensity, $R_o(\lambda)$ is a reflectance of an object detected by said IR detection device, $R_G(\lambda)$ and $T_G(\lambda)$ are a reflectance and a transmittance of glass, otherwise $R_G(\lambda)=0$ and $T_G(\lambda)=1$, constant η is a measure of the percentage of light from said illuminator reflected from vehicle glass and received by said detector, otherwise η is zero, $T_L^i(\lambda)$ is a transmittance of the $i^{th}$ filter, and $D(\lambda)$ is a responsivity of said detecting device.

4. The method of claim 1, wherein determining said total number of living objects in said IR image based upon said classified pixels comprises cross-referencing an intensity value associated with each of said pixels with at least one calculated intensity value using one known reflectance obtained from a storage device.

5. The method of claim 4, wherein said storage device further contains any of a power spectra of said illuminator, a transmittance of a filter, and a responsivity curve of a detector on said detection device.

6. The method of claim 1, further comprising:
   combining any of said pixel intensity values to generated at least one new intensity value for said pixel;
   producing a new ratio using said generated new pixel intensity values;
   forming a new threshold from said ratio; and
   using said new threshold to classify said pixel.

7. The method of claim 1, wherein said IR image is motion corrected.

8. The method of claim 1, wherein said living objects are human occupants in a motor vehicle.

9. A system for determining the number of living objects in an IR image obtained by an IR imaging system, the system comprising:
   an IR imaging system comprising an IR detection device and an IR Illuminator;
   a memory and a storage medium; and
   a processor in communication with and said storage medium and said memory, said processor executing machine readable instructions for performing the method of:
   collecting a total of N intensity values for each pixel in an IR image, said intensity values having been collected using said IR imaging system;
   for each pixel in said IR image:
   generating a ratio of said pixel's collected intensity values comprising:

$$[I_c(i) - I_c(k)] / [I_c(j) - I_c(k)],$$

where i, j, k are any N-band indices different from each other;
   forming a threshold from said generated ratio; and
   using said threshold to classify said pixel as being from a living or non-living object; and
   determining a total number of living objects in said IR image based upon said pixel classifications.

10. The system of claim 9, wherein said IR detection device is a single IR detection device, and wherein said IR Illuminator is a sequentially illuminating N-band illuminator (N≧3) with one fixed filter, said intensity value comprising:

$$I_c(i) = \alpha \int_{\lambda_1}^{\lambda_2} I_s^i(\lambda)[T_G^2(\lambda)R_o(\lambda) + \eta R_G(\lambda)]T_L(\lambda)D(\lambda)d\lambda + I_b,$$

where i=1 ... N, such that i is the $i^{th}$ IR band from said illuminator that is sequentially illuminating, $\alpha$ is a constant that depends on an angle and distance from said illumination source, an attenuation of an IR wave in the air, and an integration time of said detecting device, $I_s^i(\lambda)$ is the intensity of the $i^{th}$ band of the light source, $I_b$ is an intensity from a background light source such as that from the IR component of sunlight, $R_o(\lambda)$ is a reflectance of an object detected by said IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from said illuminator reflected from vehicle glass and received by said detector, otherwise $\eta$ is zero, $T_L(\lambda)$ is a transmittance of said fixed filter, and $D(\lambda)$ is a responsivity of said detection device.

11. The system of claim 9, wherein said IR detection device is N detection devices having N band pass filters (N≧3), and said IR Illuminator has one illuminator covering a wavelength range of said filters, said intensity value comprising:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b,$$

where i=1 ... N, such that i is the $i^{th}$ IR band pass filter, $\alpha$ is a constant that depends on an angle and distance from said illumination source, an attenuation of an IR wave in the air, and an integration time of said detecting device, $I_s(\lambda)$ is the intensity of the light source, $I_b$ is a background intensity, $R_o(\lambda)$ is a reflectance of an object detected by said IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from said illuminator reflected from vehicle glass and received by said detector, otherwise $\eta$ is zero, $T_L^i(\lambda)$ is a transmittance of the $i^{th}$ filter, and $D(\lambda)$ is a responsivity of said detecting device.

12. The system of claim 9, wherein determining said total number of living objects in said IR image based upon said classified pixels comprises cross-referencing an intensity value associated with each of said pixels with at least one calculated intensity value using one known reflectance obtained from a storage device.

13. The system of claim 12, wherein said storage device further contains any of a power spectra of said illuminator, a transmittance of a filter, and a responsivity curve of a detector on said detection device.

14. The system of claim 9, further comprising:
combining any of said pixel intensity values to generated at least one new intensity value for said pixel;
producing a new ratio using said generated new pixel intensity values;
forming a new threshold from said ratio; and
using said new threshold to classify said pixel.

15. The system of claim 9, wherein said IR image is motion corrected.

16. The system of claim 9, wherein said living objects are human occupants in a motor vehicle.

17. A computer implemented method for determining the number of living objects in an IR image obtained by an IR imaging system, the method comprising:
collecting a total of N intensity values for each pixel in an IR image, said intensity values having been collected using a IR imaging system comprising an IR detection device and an IR Illuminator;
for each pixel in said IR image:
generating a ratio of said pixel's collected intensity values comprising:

$$[I_c(i) - I_c(k)]/[I_c(j) - I_c(k)],$$

where i, j, k are any N-band indices different from each other;
forming a threshold from said generated ratio; and
using said threshold to classify said pixel as being from a living or non-living object; and
determining a total number of living objects in said IR image based upon said pixel classifications.

18. The computer implemented method of claim 17, wherein said IR detection device is a single IR detection device, and wherein said IR Illuminator is a sequentially illuminating N-band illuminator (N 3) with one fixed filter, said intensity value comprising:

$$I_c(i) = \alpha \int_{\lambda_1}^{\lambda_2} I_s^i(\lambda)[T_G^2(\lambda)R_o(\lambda) + \eta R_G(\lambda)]T_L(\lambda)D(\lambda)d\lambda + I_b,$$

where i=1 ... N, such that i is the $i^{th}$ IR band from said illuminator that is sequentially illuminating, $\alpha$ is a constant that depends on an angle and distance from said illumination source, an attenuation of an IR wave in the air, and an integration time of said detecting device, $I_s^i(\lambda)$ is the intensity of the $i^{th}$ band of the light source, $I_b$ is an intensity from a background light source such as that from the IR component of sunlight, $R_o(\lambda)$ is a reflectance of an object detected by said IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from said illuminator reflected from vehicle glass and received by said detector, otherwise $\eta$ is zero, $T_L(\lambda)$ is a transmittance of said fixed filter, and $D(\lambda)$ is a responsivity of said detection device.

19. The computer implemented method of claim 17, wherein said IR detection device is N detection devices having N band pass filters (N 3), and said IR Illuminator has one illuminator covering a wavelength range of said filters, said intensity value comprising:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b,$$

where i=1 ... N, such that i is the $i^{th}$ IR band pass filter, a is a constant that depends on an angle and distance from said illumination source, an attenuation of an IR wave in the air, and an integration time of said detecting device, $I_s(\lambda)$ is the intensity of the light source, $I_b$ is a background intensity, $R_o(\lambda)$ is a reflectance of an object detected by said IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from said illuminator reflected from vehicle glass and received by said detector, otherwise $\eta$ is zero, $T_L^i(\lambda)$ is a transmittance of the $i^{th}$ filter, and $D(\lambda)$ is a responsivity of said detecting device.

20. The computer implemented method of claim 17, wherein determining said total number of living objects in said IR image based upon said classified pixels comprises cross-referencing an intensity value associated with each of said pixels with at least one calculated intensity value using one known reflectance obtained from a storage device.

21. The computer implemented method of claim 20, wherein said storage device further contains any of a power spectra of said illuminator, a transmittance of a filter, and a responsivity curve of a detector on said detection device.

22. The computer implemented method of claim 17, further comprising:
combining any of said pixel intensity values to generated at least one new intensity value for said pixel;

producing a new ratio using said generated new pixel intensity values;

forming a new threshold from said ratio; and using said new threshold to classify said pixel.

23. The computer implemented method of claim 17, wherein said IR image is motion corrected.

24. The computer implemented method of claim 17, wherein said living objects are human occupants in a motor vehicle.

* * * * *